United States Patent
Raichle et al.

(10) Patent No.: US 6,666,069 B2
(45) Date of Patent: Dec. 23, 2003

(54) METHOD AND DEVICE FOR ANALYZING A SIGNAL FROM AN ION CURRENT SENSOR IN AN INTERNAL COMBUSTION ENGINE

(75) Inventors: Franz Raichle, Korntal-Muenchingen (DE); Joachim Berger, Winterbach (DE); Rainer Strohmaier, Stuttgart (DE); Wolfgang Fischer, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 09/792,590

(22) Filed: Feb. 23, 2001

(65) Prior Publication Data

US 2001/0017055 A1 Aug. 30, 2001

(30) Foreign Application Priority Data

Feb. 24, 2000 (DE) .......................................... 100 08 552

(51) Int. Cl.[7] .............................................. G01M 15/00
(52) U.S. Cl. ...................................... 73/35.08; 73/117.3
(58) Field of Search ................................ 73/35.08, 116, 73/861.09, 117.3; 123/406.21, 406.35, 406.39

(56) References Cited

U.S. PATENT DOCUMENTS

| | | | |
|---|---|---|---|
| 5,546,793 A | | 8/1996 | Gimmler et al. |
| 5,611,754 A | * | 3/1997 | Haga et al. ................. 477/181 |
| 5,676,113 A | * | 10/1997 | Johansson et al. .......... 123/425 |
| 5,755,206 A | | 5/1998 | Takahashi et al. |

FOREIGN PATENT DOCUMENTS

| | | |
|---|---|---|
| DE | 196 47 161 | 12/1997 |
| EP | 0190206 | 8/1986 |

* cited by examiner

*Primary Examiner*—Kamand Cuneo
*Assistant Examiner*—Monica D. Harrison
(74) *Attorney, Agent, or Firm*—Kenyon & Kenyon

(57) ABSTRACT

A method and a device for analyzing a signal from an ion current sensor of an internal combustion engine. At least one torque quantity characterizing the torque produced by the internal combustion engine is determined on the basis of a signal from the ion current sensor.

8 Claims, 2 Drawing Sheets

METHOD AND DEVICE FOR ANALYZING A SIGNAL FROM AN ION CURRENT SENSOR IN AN INTERNAL COMBUSTION ENGINE

BACKGROUND INFORMATION

To determine the torque of an internal combustion engine, it is generally known to measure the torsion of one driving shaft. In so doing, one determines a resulting torque where the torque produced by the engine is decreased by the amounts which, for example, are used for ancillary components.

European Patent No. EP 0190206 describes a device for measuring and regulating the operating data of internal combustion engines. It describes producing a test signal, e.g., to regulate the exhaust-gas recirculation, by utilizing the ionization of the combustion gasses at high temperatures, by measuring the electrical conductivity of the partially ionized combustion gasses, using a voltage.

The disadvantage of the related art with respect to measuring the torsion of the driving shaft is that vibrations occur which lead to inaccuracies in the evaluation.

SUMMARY OF THE INVENTION

An object of the present invention is to determine the average engine torque (gas torque) (combustion torque) more efficiently and accurately.

The procedure according to the present invention has the advantage that the torque (combustion torque) produced during combustion is determined directly from the signal from the ion current sensor and, thus, from an internal engine quantity.

The term combustion torque denotes the entire torque produced by the combustion in the cylinder. It breaks up into wheel torque, which is ultimately available to the drive, and torques, which are to be provided due to friction losses and for the ancillary components.

While the wheel torque plays a major role in vehicle performance, knowing the combustion torque is important for protecting the engine in order to prevent a thermal overloading due to too high a power output.

An additional advantage is that the torque contribution, which must be provided for the ancillary components, is also considered, thereby making it possible to determine the actual normal output produced by the engine. By fitting all cylinders with an ion current sensor, the average combustion torque, as well as the cylinder-related, individual torques can be determined. These torques can be used as input variables for a method for coordinating the cylinders.

DETAILED DESCRIPTION

Figure 1:
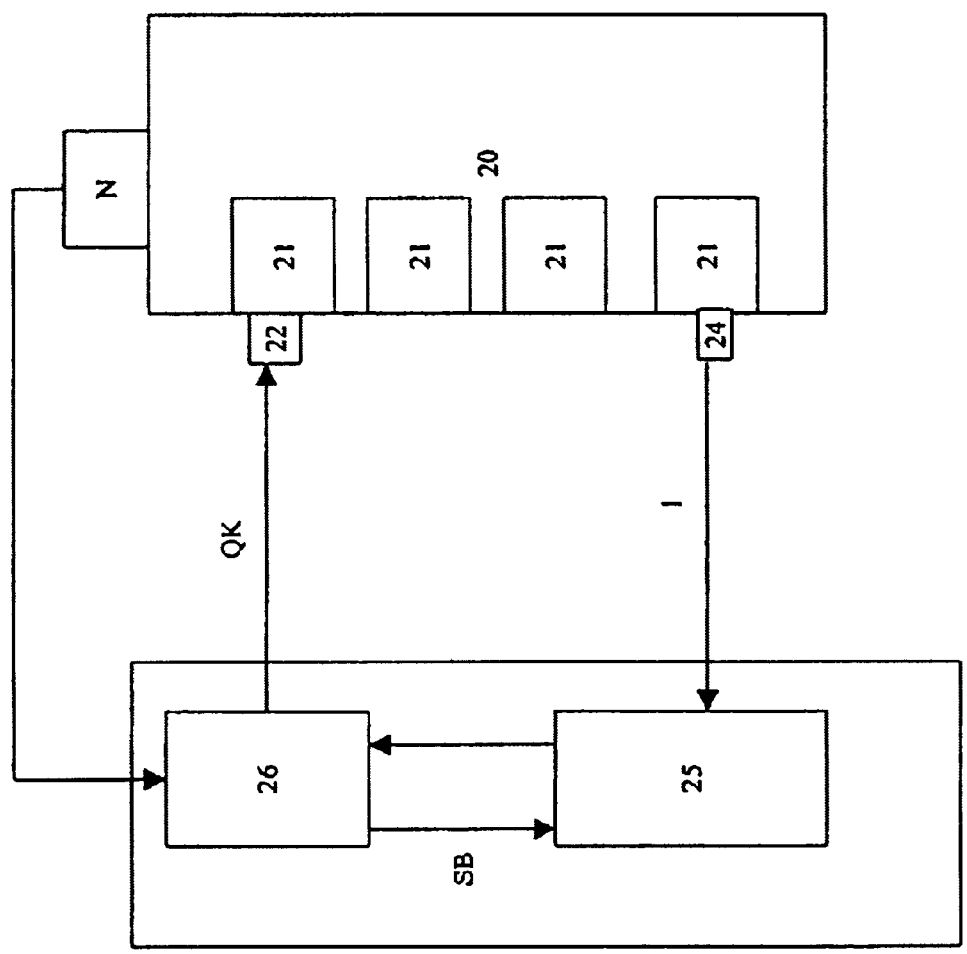
FIG. 1 shows a block diagram of the important elements of the present invention.

In FIG. 1, reference numeral 20 indicates a multi-cylinder internal combustion engine. The cylinders are represented symbolically and are designated by reference numeral 21. The rotational speed of internal combustion engine 20 is determined by speed sensor N, preferably using an inductive sensor, or by a Hall element, a magnetoresistive sensor, or the like. The signal from speed sensor N is supplied to an electronic control unit 23 for controlling at least the fuel injection. Preferably, each cylinder 21 is assigned a fuel-quantity positioner 22, which is used to meter the fuel quantity preset by control unit 23. Injectors of a common-rail system, unit injector systems, distributor pumps, or other fuel-quantity positioners can be used as fuel-quantity positioners 22. Preferably, fuel-quantity positioners are used which provide for the quantity to be metered using the actuating time of solenoid valves or piezo-actuators.

Preferably, at least one cylinder is provided with an ion current sensor 24, whose signal is analyzed in an evaluator 25 of electronic control unit 23. Electronic control unit 23 includes a device 26 for controlling injected fuel quantity. Device 26 for controlling injected fuel quantity transmits different signals, such as different measured variables, e.g., rotational speed N, internal quantities, such as the amount of fuel to be injected QK, and the start of injection SB, to evaluator 25 where the quantities are processed together with the signal(s) from the ion current sensor. The processing result is sent to device 26 for controlling injected fuel quantity. Based on these signals, device 26 for controlling injected fuel quantity selects the control signal for fuel-quantity positioner 22 of individual cylinders 21.

Figure 2:
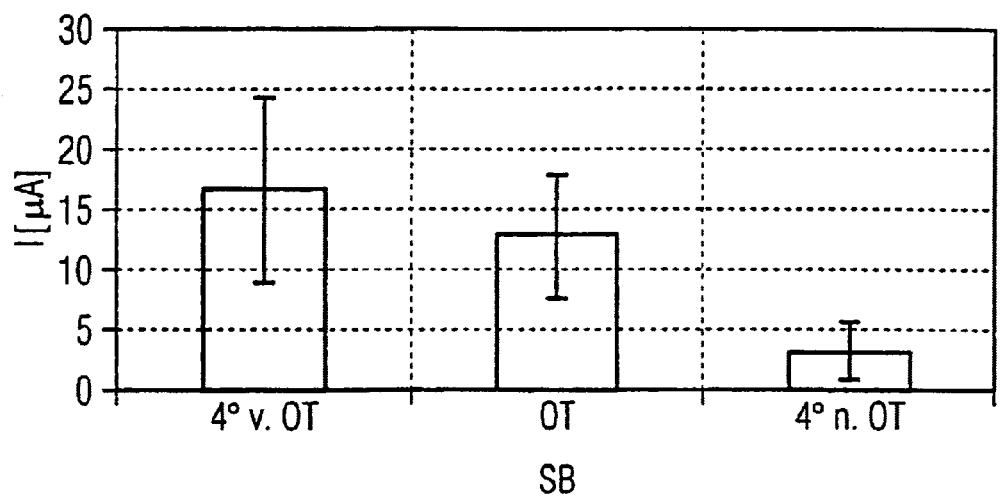
FIG. 2 shows the signal from the ion current sensor as a function of the start of injection.
Figure 3:
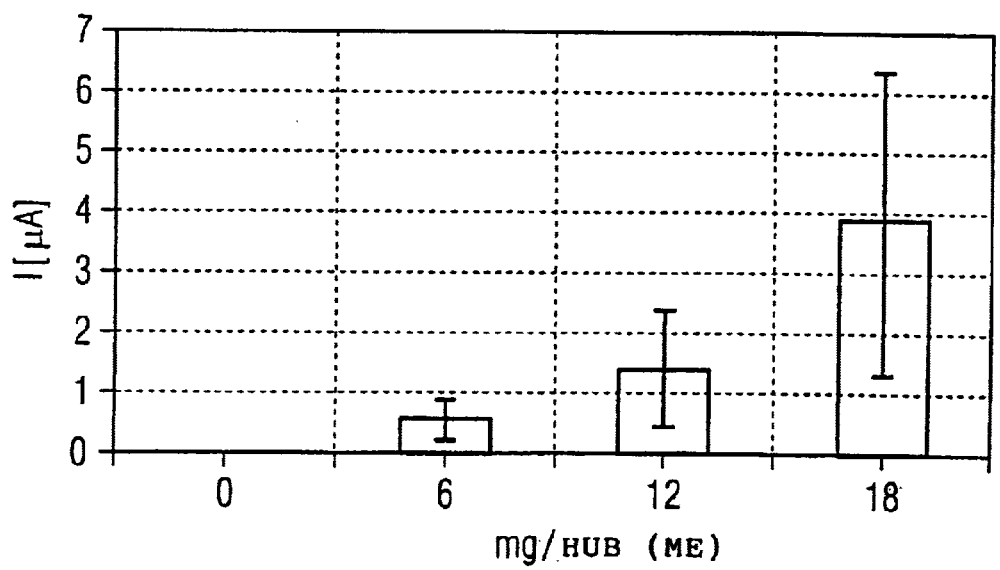
FIG. 3 shows the signal from the ion current sensor at a defined start of injection as a function of the injected fuel quantity.

Signal I from the ion current sensor, which is measured during combustion, is substantially dependent on two quantities. These quantities are injection quantity ME and start of injection SB. In this context, the following functional relation applies:

The combustion torque is determined from the signal from the ion current sensor with the aid of the functional relations with the start of injection and the injection quantity, as shown in FIGS. 2 and 3. This necessitates an at least two-dimensional characteristics map, which is initially experimentally determined. As a signal, one can draw upon either the ion current having the maximum flow during each combustion cycle or the integral of the current signal with respect to time, i.e., the charge quantity that flowed during each combustion cycle.

By inverting the above-mentioned relation, the injection quantity can be reconstructed from the signal from the ion current sensor and from start of injection SB:

Since engine torque MD is also dependent on injection quantity ME and start of injection SB, engine torque MD can be determined from the signal from the ion current sensor and from start of injection SB:

For that purpose, the signal measured by the ion current sensor is evaluated with respect to signal amplitude I. To compensate for fluctuations in the signal, mean values are generated over several working cycles. One working cycle includes two complete crankshaft revolutions (720° KW). Combustion occurs during the one revolution, and the charge changing process during the second.

Using a characteristics map, the torque is subsequently determined from the input variables, which include a signal from the ion current sensor and start of injection SB. The start of injection is available in control unit 23 as a setpoint value of a start-of-injection control.

Greater accuracy can be achieved by using the corresponding actual value instead of the setpoint value. To this end, it is particularly advantageous when an actual combustion start VB measured by the ion current sensor is used as a baseline. There is a close relation between start of injection SB and combustion start VB. The characteristics map is to be adjusted accordingly.

Due to the averaging (mean value generation) necessary for analyzing the signal from the ion current sensor, the torque signal determined here is an average torque.

The signal exhibits stochastic deviations in the signal height and signal pattern, which must be filtered for additional processing. This can be carried out by a low-pass filtering, for example, in the form of a sliding (moving) averaging, or by another method.

FIG. 2 exemplarily shows the functional relationship between start of injection (SB), which is plotted on the X-axis, and the signal from the ion current sensor, which is plotted on the Y-axis. Start of injection SB is varied between 4° KW before top dead center and 4° KW after top dead center.

FIG. 3 exemplarily shows the functional relation between the injected fuel quantity/stroke and the signal from the ion current sensor. In this context, the injection quantity varies between 6 and 18 mg of fuel per stroke. The corresponding ion current values are to be extracted in accordance with the coordinate scale on the Y-axis.

According to the present invention, at least one torque quantity characterizing the torque produced by the internal combustion engine is determined based on the signal from the ion current sensor. In particular, the combustion torque is determined. In this instance, additional torque quantities can be calculated from this combustion torque.

According to the present invention, in addition to the signal from the ion current sensor, a quantity characterizing the start of the fuel injection or the combustion start is used to determine the torque. To this end, the setpoint value and/or the actual value of a start-of-injection control can be used. In this context, it is advantageous that no additional sensors are needed for determining these quantities. Other quantities having a close relation to the start of injection, in particular the controller corresponding to the start of pump delivery or to the triggering signals, can also be used instead of the start of injection. Using the combustion start is particularly advantageous since it can also be determined based on the signal from the ion current sensor.

To increase the accuracy of the signal, it is advantageous to perform a filtering, in particular, an averaging. In this context, the signal from the ion current sensor and/or the torque quantity can be filtered.

What is claimed is:

1. A method for evaluating a signal of an ionic-current sensor of an internal combustion engine, comprising:

determining a signal amplitude of the ionic-current sensor;

determining a combustion value of the internal combustion engine; and determining a torque value of the internal combustion engine as a function of the signal amplitude and the combustion value using a characteristic map, wherein, the signal amplitude is representative of one of a maximum ionic current flowing during a combustion cycle and an integral of the ionic-current signal with respect to time during the combustion cycle, and the combustion value is representative of one of a beginning of the fuel injection and a start of combustion.

2. The method as recited in claim 1 further comprising:

filtering the torque value.

3. The method as recited in claim 1 further comprising:

filtering the signal amplitude of the ionic-current sensor.

4. The method as recited claim 2, further comprising:

determining an average of the torque value over a plurality of injection cycles.

5. The method as recited claim 3, further comprising:

determining an average of the signal amplitude over a plurality of injection cycles.

6. The method as recited in claim 1, further comprising:

determining the start of combustion as a function of a signal of the ionic-current sensor.

7. The method as recited in claim 1, wherein the beginning of fuel injection corresponds to a start of pump delivery.

8. A device for evaluating a signal of an ionic-current sensor of an internal combustion engine, comprising:

means for determining a signal amplitude of the ionic-current sensor;

means for determining a combustion value of the internal combustion engine; and means for determining a torque value of the internal combustion engine as a function of the signal amplitude and the combustion value using a characteristic map, wherein, the signal amplitude is representative of one of a maximum ionic current flowing during a combustion cycle and an integral of the ionic-current signal with respect to time during the combustion cycle, and the combustion value is representative of one of a beginning of the fuel injection and a start of combustion.

* * * * *